United States Patent
Pabon et al.

(10) Patent No.: US 7,913,806 B2
(45) Date of Patent: *Mar. 29, 2011

(54) ENCLOSURES FOR CONTAINING TRANSDUCERS AND ELECTRONICS ON A DOWNHOLE TOOL

(75) Inventors: Miguel F. Pabon, Kay, TX (US); Fernando Garcia Osuna, Sugar Land, TX (US); David B. Ayers, Sugar Land, TX (US)

(73) Assignee: Schlumberger Technology Corporation, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/392,424

(22) Filed: Feb. 25, 2009

(65) Prior Publication Data
US 2009/0183941 A1   Jul. 23, 2009

Related U.S. Application Data

(63) Continuation of application No. 11/379,134, filed on Apr. 18, 2006.

(51) Int. Cl.
*G01V 1/40* (2006.01)
*G01V 1/00* (2006.01)
*E21B 47/00* (2006.01)

(52) U.S. Cl. ........ 181/104; 181/102; 181/108; 181/110; 181/111; 181/112; 166/254.2; 166/255.2; 367/27; 367/35; 175/50

(58) Field of Classification Search ............... 181/104, 181/102, 108, 110, 111, 112; 166/254.2, 166/255.2; 367/27, 35; 175/50
See application file for complete search history.

(56) References Cited

U.S. PATENT DOCUMENTS

| 3,184,965 | A | * | 5/1965 | Philippe | 73/152.51 |
| 3,401,772 | A | * | 9/1968 | Kokesh | 367/35 |
| 3,542,150 | A | | 11/1970 | Youmans et al. | |
| 4,219,095 | A | | 8/1980 | Trouiller | |
| 4,658,897 | A | | 4/1987 | Kompanek et al. | |
| 4,780,862 | A | * | 10/1988 | Clerke | 367/166 |
| 4,805,156 | A | * | 2/1989 | Attali et al. | 367/35 |
| 4,855,965 | A | * | 8/1989 | Rambow | 367/69 |
| 4,881,208 | A | * | 11/1989 | Liu | 367/35 |
| 4,928,031 | A | * | 5/1990 | Linyaev et al. | 310/346 |
| 5,477,101 | A | | 12/1995 | Ounadjela | |
| 5,509,303 | A | * | 4/1996 | Georgi | 73/152.18 |
| 5,541,889 | A | * | 7/1996 | Priest et al. | 367/35 |

(Continued)

FOREIGN PATENT DOCUMENTS

EP   0837217 B1   5/2003

(Continued)

*Primary Examiner* — Elvin G Enad
*Assistant Examiner* — Christina Russell
(74) *Attorney, Agent, or Firm* — James McAleenan; Vincent Loccisano; Brigid Laffey (57) ABSTRACT

A measurement package for disposal on an apparatus such as a downhole tool or a tool like device. The measurement package including an enclosure, a first acoustic transducer housed within the enclosure, a second acoustic transducer housed within the enclosure and electronics housed within the enclosure that is in communication with the first and second transducers. Further, an acoustic transmitter and receivers can be disposed at an angle with respect to a longitudinal axis of the enclosure. The enclosure can contain attenuative material surrounding the transmitter and receivers, and electronics for controlling the transmitter and receivers and communicating with the downhole tool.

36 Claims, 8 Drawing Sheets

U.S. PATENT DOCUMENTS

| | | | |
|---|---|---|---|
| 5,640,371 A * | 6/1997 | Schmidt et al. | 367/153 |
| 5,763,773 A * | 6/1998 | Birchak et al. | 73/152.58 |
| 5,907,099 A | 5/1999 | Huang et al. | |
| 6,084,052 A | 7/2000 | Aufdermarsh et al. | |
| 6,173,793 B1 | 1/2001 | Thompson et al. | |
| 6,179,066 B1 * | 1/2001 | Nasr et al. | 175/45 |
| 6,213,250 B1 | 4/2001 | Wisniewski et al. | |
| 6,281,489 B1 * | 8/2001 | Tubel et al. | 250/227.14 |
| 6,300,762 B1 | 10/2001 | Thomas, Jr. et al. | |
| 6,466,513 B1 | 10/2002 | Pabon et al. | |
| 6,483,777 B1 * | 11/2002 | Zeroug | 367/35 |
| 6,540,021 B1 * | 4/2003 | Botrel | 166/250.08 |
| 6,564,883 B2 | 5/2003 | Fredericks et al. | |
| 6,637,524 B2 * | 10/2003 | Kruspe et al. | 175/40 |
| 6,671,380 B2 | 12/2003 | Chang et al. | |
| 6,710,600 B1 | 3/2004 | Kopecki et al. | |
| 6,928,202 B2 | 8/2005 | Pickrell et al. | |
| 6,932,154 B2 * | 8/2005 | Zillinger | 166/66 |
| 6,957,708 B2 * | 10/2005 | Chemali et al. | 175/50 |
| 7,150,317 B2 * | 12/2006 | Barolak et al. | 166/254.2 |
| 7,250,768 B2 | 7/2007 | Ritter et al. | |
| 7,296,927 B2 | 11/2007 | Reddy et al. | |
| 7,353,879 B2 | 4/2008 | Todd et al. | |
| 7,364,007 B2 * | 4/2008 | Garcia-Osuna et al. | 181/108 |
| 7,380,466 B2 * | 6/2008 | Deeg | 73/803 |
| 7,418,865 B2 * | 9/2008 | Griffiths et al. | 73/597 |
| 7,525,872 B2 * | 4/2009 | Tang et al. | 367/35 |
| 7,665,544 B2 * | 2/2010 | Forgang et al. | 175/50 |
| 2005/0056415 A1 * | 3/2005 | Zillinger | 166/66 |
| 2005/0205268 A1 * | 9/2005 | Engels et al. | 166/381 |

FOREIGN PATENT DOCUMENTS

GB    2275338 A    8/1994

* cited by examiner

ENCLOSURES FOR CONTAINING TRANSDUCERS AND ELECTRONICS ON A DOWNHOLE TOOL

CROSS-REFERENCE TO RELATED APPLICATIONS

This patent application is a continuation-in-part of U.S. patent application Ser. No. 11/379,134, filed Apr. 18, 2006, which claims benefit of U.S. Provisional Patent Application Ser. No. 60/594,830, filed May 10, 2005, both of which are incorporated by reference herein.

BACKGROUND OF THE INVENTION

1. Field of the Invention

Implementations of various technologies described herein generally relate to the packaging or housing of various sources, sensors and electronics for use inside a wellbore.

2. Background of the Invention

The methodology of housing or packaging sources, sensors, electronics, and general components has seen many changes as technologies and materials have improved over time. In the oil and gas industry, subsurface formations are typically probed by well logging instruments to determine the formation characteristics. Data is typically acquired using sources and sensors disposed on a downhole tool and either stored in downhole memory or transmitted to the surface. As used herein, the term "transducers" is understood to encompass devices capable of operation as sources and/or sensors, and is not to be limited to any one particular signal type (i.e., acoustic, gravity, electromagnetic, pressure, etc.).

In conventional logging operations, particularly in wireline applications, the transducers are often placed on the downhole tool such that they are exposed to the subsurface environment. In some implementations the transducers are mounted within a tool housing filled with a fluid, such as oil. A drawback with this methodology is that such implementations may require volume compensation for the oil. Such mechanisms often entail pistons or bellows that move in response to displacement of the oil as a result of pressure and temperature changes. Further, certain compensating components exposed to the downhole environment may need to be cleaned in between downhole trips to ensure that they function properly. Such mechanisms also increase the mechanical complexity of the system.

However, in logging while drilling (LWD) or measuring while drilling (MWD) applications, the above methodology is not particularly suitable or reliable due to the harsh drilling environment, which may be characterized by high shock conditions, high pressures and high temperatures. Consequently, the transducers and associated electronics are typically disposed inside the drill string and are thereby isolated from the harsh drilling environment, which is detrimental to their ability to serve their intended purposes.

Additionally, when employing acoustic arrays on LWD tools, the conventional approach of having a through-hole in the collar for mounting each transmitter, and each receiver, create certain challenges. For example, the conventional approach greatly limits the sensor spacing distances and the sensor angles. Also, with the conventional approach, tool mechanical-integrity (through bending and pressure) must be maintained and this places added limitations on sensor geometries.

A need remains for improved techniques to package and house transducers and electronics for subsurface use.

SUMMARY OF THE INVENTION

According to embodiments, an enclosure for disposal on a downhole tool is provided. The enclosure includes a first acoustic transducer, a second acoustic transducer; and electronics coupled to the first and second transducers. The first and second transducers and the electronics are housed within the enclosure. The enclosure is designed for mounting on a portion of drill collar as part of an LWD acoustic tool. The enclosure can have acoustic attenuative material substantially surrounding at least the first and second transducers.

According to at least one embodiment of the invention, the invention includes a measurement package for disposal on a downhole tool. The measurement package comprising: an enclosure; a first acoustic transducer housed within the enclosure; a second acoustic transducer housed within the enclosure; and electronics housed within the enclosure and in communication with the first and second transducers.

According to an aspect of the invention, the enclosure can be designed for mounting on a portion of a drill collar such that the enclosure is located substantially away from the central axis of the drill collar. Further, the measurement package may further comprise of an acoustic attenuative material positioned within the enclosure so as to substantially attenuate acoustic energy travelling from the first transducer to the second transducer. Further still, the attenuative material includes an attenuative block positioned between the first and second transducers. It is possible the attenuative block includes alternating acoustic energy scattering members and acoustic energy absorption members. Further, the scattering members can be steel and the absorption members can be rubber.

According to an aspect of the invention, the measurement package can further comprise of acoustic attenuative material housed within the enclosure and substantially surrounding at least the first and second transducers. Further, the attenuative material can substantially attenuate acoustic energy between the first transducer and the downhole tool. Further still, the attenuative material can be primarily solid, among other things. It is possible the material can include a tungsten-rubber attenuating material.

According to an aspect of the invention, the measurement package can further comprise of attenuative material outside the enclosure. Further, the attenuative material can absorb substantial amounts of acoustic energy and surrounds the enclosure so as to substantially attenuate acoustic energy travelling between the downhole tool and the enclosure. Further still, the measurement package can further comprise pressure compensating fluid housed within the enclosure. It is possible the measurement package can further comprise a deformable membrane housed within the enclosure so as to allow for volume changes of the pressure compensating fluid due to changes in pressure. Further, the first and second transducers can be disposed at one or more non-perpendicular angles with respect to the longitudinal axis of the enclosure. Further still, the first transducer can be an acoustic transmitter and disposed at a first angle with respect to the longitudinal axis of the enclosure, and the second transducer can be an acoustic receiver and disposed at a second angle with respect to the longitudinal axis of the enclosure.

According to an aspect of the invention, the first transducer is a transmitter and the second transducer is a first acoustic receiver, the enclosure further comprising a second acoustic receiver and a third acoustic receiver, the second and third receivers being housed within the enclosure. According to an aspect of the invention, the measurement package can further comprise a first window member positioned in front of the first transducer and outside the enclosure, and a second window member positioned in front of the second transducer and outside the enclosure. Further, the first and second window members can be replaceable and protect the transducers from the borehole environment while transmitting acoustic energy between the borehole environment and the transducers. Further still, the first and/or second windows members can be dimensioned and constructed of materials which have acoustic refractive properties that allow for beam steering and/or beam shaping of acoustic energy transmitted or received by the first and/or second transducer. It is possible, the first transducer can be a transducer array including a plurality of individually activatable acoustic transmitter elements which can be controlled by the electronics such that a beam of acoustic energy can be directed in controlled directions. Further, the first and second transducers can be designed to operate primarily in the ultrasonic acoustic range.

According to at least one embodiment of the invention, the invention includes a downhole tool for subsurface disposal. The downhole tool comprises: an elongated support; and an enclosure disposed on the support, the enclosure comprising: a first acoustic transducer, a second acoustic transducer, and electronics coupled to the first and second transducers, wherein first and second transducers and the electronics are housed within the enclosure.

According to an aspect of the invention, the elongated support can be a drill collar. Further, the enclosure can further comprise of an acoustic attenuative material positioned within the enclosure so as to substantially attenuate acoustic energy travelling from the first transducer to the second transducer. Further still, the acoustic attenuative material can include a attenuative block having alternating acoustic scattering members and acoustic absorbing members. It is possible the enclosure can further comprise an acoustic attenuative material substantially surrounding at least the first and second transducers, the attenuative material substantially absorbing acoustic energy between the first transducer and the elongated support.

According to an aspect of the invention, the downhole tool can further comprise of an attenuative material outside the enclosure that absorbs substantial amounts of acoustic energy and surrounds the enclosure so as to substantially attenuate acoustic energy travelling between the elongated support and the enclosure. Further, the first and second transducers can be disposed at one or more non-perpendicular angles with respect to the longitudinal axis of the elongated support. Further still, the downhole tool can further comprise of a first window member positioned in front of the first transducer and outside the enclosure, and a second window member positioned in front of the second transducer and outside the enclosure. It is possible the first and second window members can be replaceable and protect the transducers from the borehole environment while transmitting acoustic energy between the borehole environment and the transducers. Further, the first transducer can be a transducer array including a plurality of individually activatable acoustic transmitter elements which can be controlled by the electronics such that a beam of acoustic energy can be directed in controlled directions. Further still, the first and second transducers can be designed to operate primarily in the ultrasonic acoustic range.

According to at least one embodiment of the invention, the invention includes a method for making acoustic measurements in a borehole with a downhole tool. The method comprises: positioning the downhole tool in the borehole, the downhole tool having an enclosure mounted thereon; activating a first transducer so as to transmit acoustic energy into the downhole environment; and detecting a response to the transmitted acoustic energy with a second transducer, wherein the enclosure houses the first and second transducers and electronics coupled to the first and second transducers.

According to an aspect of the method, the method can be carried out during the construction process of the borehole. Further still, the enclosure further houses acoustic attenuative material positioned within the enclosure so as to substantially attenuate acoustic energy travelling from the first transducer to the second transducer. It is possible the enclosure further houses acoustic attenuative material substantially surrounding at least the first and second transducers, the attenuative material substantially attenuating acoustic energy between the first transducer and downhole tool. Further, the acoustic energy travelling between the downhole tool and the enclosure can be substantially attenuated with attenuative material outside and surrounding at least portions of the enclosure. Further, the first transducer can be a transducer array including a plurality of individually activatable acoustic transmitter elements which can be controlled by the electronics such that a beam of acoustic energy can be directed in controlled directions. Further still, the first and second transducers are designed to operate primarily in the ultrasonic acoustic range. It is possible the method can further comprise using the electronics to synchronize the activating of the first transducer and the detecting with the second transducer. Further still, the method may further comprise using the electronics to digitize, process and record waveforms and processed acoustic properties relating to responses detected by the second transducer. It is possible the method may further comprise using the electronics to synchronize acoustic measurements made with the first and second transducers with directional and/or inclination measurements made using the downhole tool.

Further features and advantages of the invention will become more readily apparent from the following detailed description when taken in conjunction with the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicated like elements.

Figure 1:
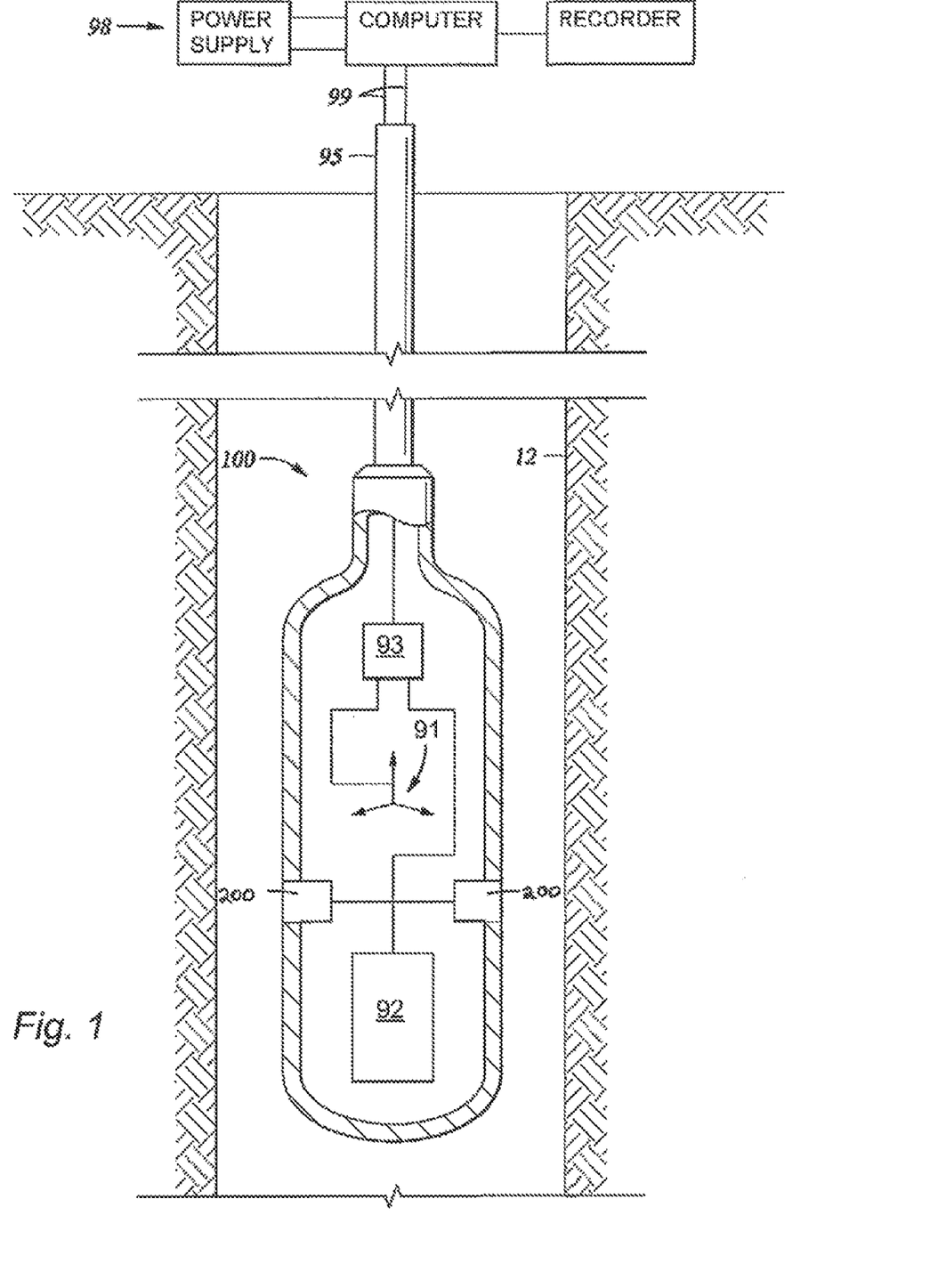
FIG. 1 illustrates a downhole tool equipped with enclosures for containing transducers and electronics in accord with the invention.

FIG. 1 illustrates a downhole tool 100 equipped with two enclosures 200, each containing transducers and electronics in accordance with implementations of various technologies described herein. Although two enclosures 200 are illustrated in the figure, it should be understood that in some implementations more or less than two enclosures may be used. The tool 100 is shown disposed in a borehole 12 that penetrates an earth formation. The enclosures 200 may be disposed on the outside surface of the downhole tool 100, which may be a drill collar, a wireline tool, casing, or any other oilfield equipment that may be deployed inside the borehole 12. The enclosure may be made from metal, plastic (e.g., polyetheretherketone PEEK® from Victrex Manufacturing Limited of Lancashire, Great Britain), or any other suitable material. Preferred materials should be strong enough to withstand the high pressures and high temperatures encountered downhole and should allow for the passage or radiation of a signal (e.g., electromagnetic, acoustic, etc.) therethrough.

The downhole tool 100 includes a multi-axial electromagnetic antenna 91 for subsurface measurements and various electronics 92, 93 with appropriate circuitry. Other embodiments of the invention may be implemented incorporating only the enclosure 200, without additional sources or sensors. The downhole tool 100 may be supported in the borehole 12 by a logging cable 95 for a wireline application or a drill string 95 for a while-drilling application. In a wireline application, the tool 100 may be raised and lowered in the borehole 12 by a winch which may be controlled by an assembly of surface equipment 98, which may include a power supply, a recorder for recording the data and a computer for processing the data. The logging cable or drill string 95 may include conductors 99 that connect the downhole electronics 92, 93 with the surface equipment 98 for signal and control communication. The downhole electronics 92, 93 may include a source of electrical energy and downhole memory for storing signals as a function of time or depth. The downhole electronics 92, 93 may also interface with a telemetry module for transmitting measurement information to the surface in real time while drilling. Alternatively, the signals may be processed or recorded in the downhole tool 100 and the processed data may be transmitted to the surface equipment 98.

The enclosure 200 may be disposed on the outside surface, or in a cavity or void, of the downhole tool 100 by any attachment techniques commonly known in the industry. For example, depending on the subsurface application, the enclosure can be affixed to the tool exterior using a suitable adhesive, retainer, fasteners and the like, or on an arm extending from the tool 100 (not shown). The enclosure 200 may be disposed on the tool 100 such that only a fraction or surface of the enclosure is exposed to the borehole 12 as desired. This can be accomplished by disposing the enclosure 200 in a cavity or void formed in the tool 100. As shown in FIG. 1, only one surface of the enclosure is exposed to the borehole 12. The implementation of FIG. 1 shows the enclosures 200 linked to the multi-axial electromagnetic antenna 91 and/or various electronics 92, 93 by conventional communication means, such as cables, fiber optics, inductive couplings, or connectors.

Figures 2, 3:
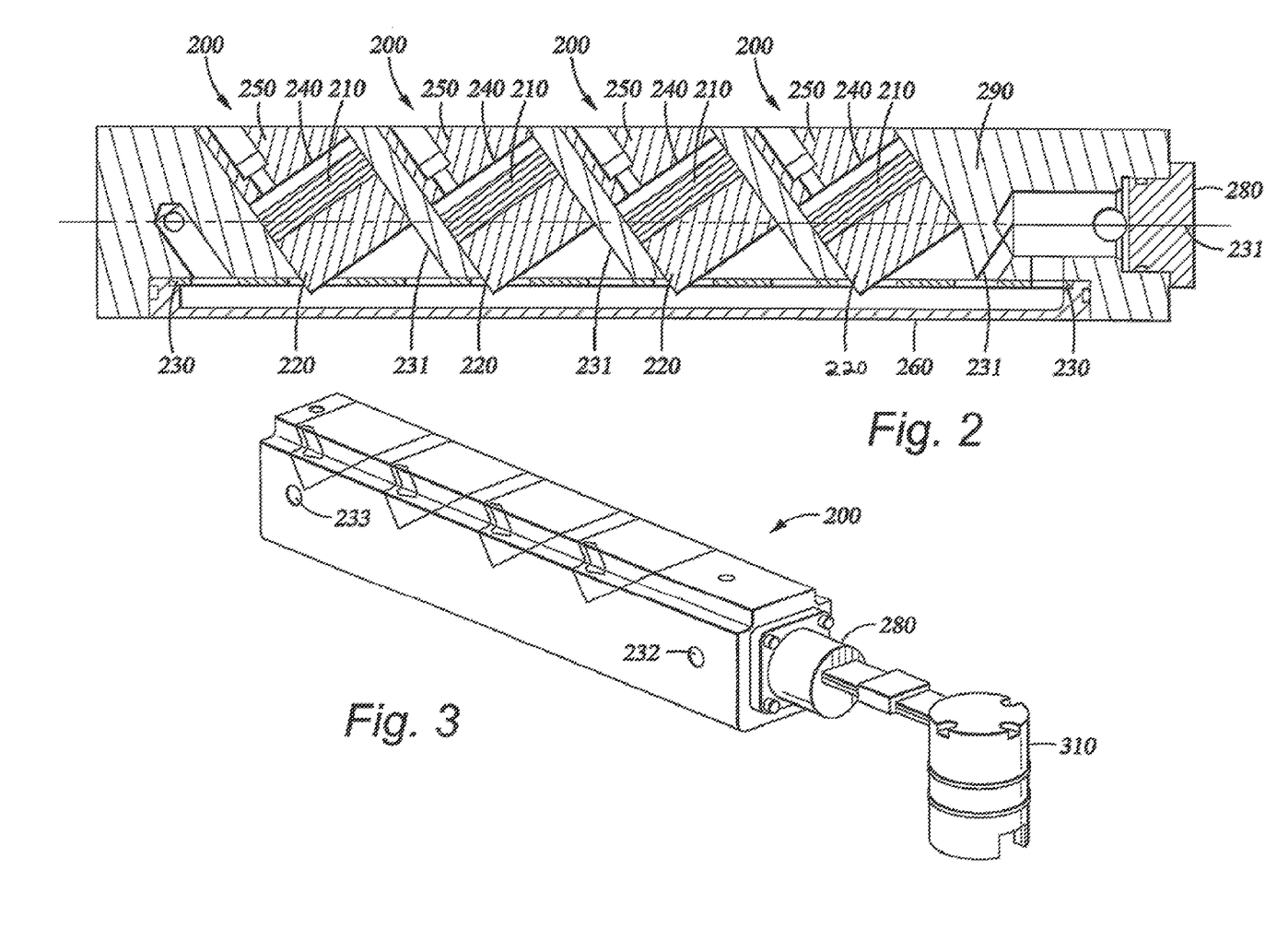
FIG. 2 illustrates an enclosure in accord with the invention.
FIG. 3 illustrates a perspective view of the enclosure shown in FIG. 2.

FIG. 2 illustrates an enclosure 200 in accordance with implementations of various technologies described herein. The enclosure 200 may include a single transducer 210 or an array of transducers 210. In one implementation, the transducers 210 may be acoustic transducers. As such, the transducers 210 may be configured to convert energy between electric and acoustic forms and may be adapted to act as a source or a sensor, or both. One skilled in the art will appreciate that other forms of transducers may be used in implementations of the invention (e.g. resistivity electrodes, pressure, gravity, light, and other source/sensor devices).

Sonic logging of earth formations entails lowering an acoustic logging instrument or tool (such as tool 100) into a borehole traversing the formation. The instrument typically includes one or more acoustic sources (i.e., a transmitter) for emitting acoustic energy into the subsurface formations and one or more acoustic sensors or receivers for receiving acoustic energy. The transmitter is periodically actuated to emit pulses of acoustic energy into the borehole, which travel through the borehole and into the formation. After propagating through the borehole and formation, some of the acoustic energy travels to the receivers, where it is detected. Various attributes of the detected acoustic energy are subsequently related to subsurface or tool properties of interest.

When implemented with acoustic transducers, the enclosures 200 of the invention can be used for sonic logging to provide valuable information regarding subsurface acoustic properties, which can be used to produce images or derive related subsurface characteristics. Acoustic waves are periodic vibrational disturbances resulting from acoustic energy that propagates through a medium, such as borehole fluid and subsurface formations. Acoustic waves are typically characterized in terms of their frequency, amplitude, phase, energy, shape, and speed of propagation. Subsurface acoustic properties of interest include compressional wave speed, shear wave speed, borehole modes, and formation slowness. Additionally, acoustic images may be used to depict borehole wall conditions and other geological features away from the borehole. These acoustic measurements have applications in seismic correlation, petrophysics, rock mechanics and other parameters related to water and hydrocarbon exploration.

Turning to FIG. 2, although only four transducers 210 are shown, it should be understood that any number of transducers may be used in implementations of the various technologies described herein. The transducers 210 may be made of any suitable materials known in the art, such as piezoelectric ceramic discs. The composition, shape and frequency properties of the transducers may vary depending on the particular application. In one implementation, each transducer 210 is made from lead metaniobate powder mix compressed and baked to form a ceramic disc of about 1 inch (2.54 cm) in diameter and with a natural resonance frequency of about 250 kHz.

The transducers 210 may be disposed on the enclosure 200 at an angle ranging from a few degrees to about 90 degrees from the longitudinal axis of the enclosure 200, as shown in FIG. 2. The transducers 210 may also be closely spaced from each other within the enclosure 200.

A backing element 220 may be coupled to the back surface of each transducer 210. The backing element 220 may be formed in a similar shape to match the transducer 210, for example in cylindrical shape if the transducer is disc shaped. The backing element 220 may be formed from any suitable material, such as rubber compounds and other known synthetic resins or mixtures, depending on the type of transducer used in a particular implementation. In an implementation using acoustic transducers, the backing element 220 can be made from a conductive material. In the case of a transducer 210 activated as a receiver, the backing element 220 may act as an attenuator to decrease the ringing of the transducer 210 after it has been struck by an incoming sound wave. In some implementations, the backing element 220 may be configured to increase the bandwidth response of the transducer 210. In some implementations, the backing element 220 may be replaced by an active, driven means of providing the attenuation (not shown).

The transducers 210 may be electrically coupled to an electronic board 230 (e.g. via wires 231), such as a printed circuit board (PCB), disposed adjacent the backing elements 220. The electronic board 230 may provide amplification, filtering, digitization and may interface with other electronic circuits, such as electronics 92, 93, which may be remotely disposed inside the downhole tool 100. The electronic board 230 may include control and processing circuitry, memory, and stored logic for emitting ultrasonic pulses via the transducers 210 and for generating return signals representative of echoes that return to the transducers 210 that interact with and return from the borehole wall. As a result of placing the electronic board 230 near the transducers 210, crosstalk between the transducers 210 and the electronic board 230 may be minimized, and interference with other circuits, such as power lines, may be reduced, thereby increasing the signal-to-noise ratio and reducing the amount of noise the measurement module may pick up from the other circuits. Signal communication to/from the electronic board 230 within the enclosure 200 and external devices is through a connector 280. In some implementations, a bulkhead 310 (shown in FIG. 3) may be used for connection with other circuits, e.g., electronics 92, 93. The bulkhead 310 may be a pressure-proof multi pin bulkhead connector as known in the art. FIG. 3 illustrates a perspective view of the enclosure 200 in accordance with implementations of various technologies described herein.

In one implementation, one side of the enclosure 200 facing the transducers 210 is formed including grooves or gaps 240 having a triangular cross section, as shown in FIG. 2. In some implementations, a wedge 250 may be disposed inside each groove 240 using an adhesive or any other attachment means commonly known in the art. The wedge 250 may be made from any suitable material that provides the desired signal transparency/properties. In one implementation, the wedge 250 may be made from polytetrafluoroethylene (PTFE) Teflon® from E.I. DuPont De Nemours & Co of Wilmington, Del., USA. As shown in the implementation of FIG. 2, the wedge 250 is exposed to the exterior and may provide an optimal interface with well fluids for an acoustic transducer, given its sound velocity characteristics. As such, the wedge 250 may be used to maintain the linearity of the angle of incidence of acoustic waves entering the transducers 210.

The enclosure 200 may further include a cover or lid 260 disposed on the opposite side of the grooves 240. The lid 260 may include an O-ring seal that acts simply as a fluid barrier. In one implementation, the lid 260 may be made from the same material as the rest of the enclosure 200, such as poly-etheretherketone PEEK®. Implementations of the enclosure 200 may be formed in more than one piece (e.g. two halves) configured to fit together to form a closed unit. FIG. 2 shows one implementation having a main body and a lid 260 with an O-ring to provide a sealed enclosure 200.

The assembled enclosure 200 may further include a fluid 290, such as a polymerized fluid, within its internal cavity to fill the voids and surround the various components such as the transducers 210, backing elements 220, and the electronic board 230. The added fluid 290 aids in insulating the housed components from temperature extremes, from high pressures, in insulating conductors from one another, and in reducing shock to the components. In one implementation, the fluid 290 may be injected into the enclosure 200 after the lid 260 is affixed in place. In this case, a vacuum can be drawn from the enclosure 200 via a first valve 232 formed in the enclosure, while the fluid is injected via a second valve 233 in the enclosure (See FIG. 3). Once filled, the valves 232, 233 can be sealed using oil-filling plugs or other means known in the art. In some implementations, the lid 260 for the enclosure 200 also acts as a compensator for volume changes in the fluid 290 due to temperature/pressure variations. The large surface area (relative to the walls of the enclosure), thinness, and flexibility of the lid 260 allow it to flex as the fluid volume changes. As shown in the cross-section of FIG. 2, a lid 260 of the invention can be implemented with a thin recessed central section and a thicker perimeter to hold an O-ring to provide a seal. Other volume compensating means can be implemented with the enclosures of the invention as known in the art.

In one implementation, a polymerized gel is used as the filler fluid 290. Suitable fluids include a silicon-based gel, such as Sylgard® 182 available from Dow Corning of Midland, Mich., USA. Subsurface temperatures and pressures may affect the fluid 290 volume within the enclosure 200. In some implementations, the enclosure 200 may further include compensating means as known in the art to compensate for the volume changes of the polymerized gel 290 without adversely affecting the housed components.

Figure 4:
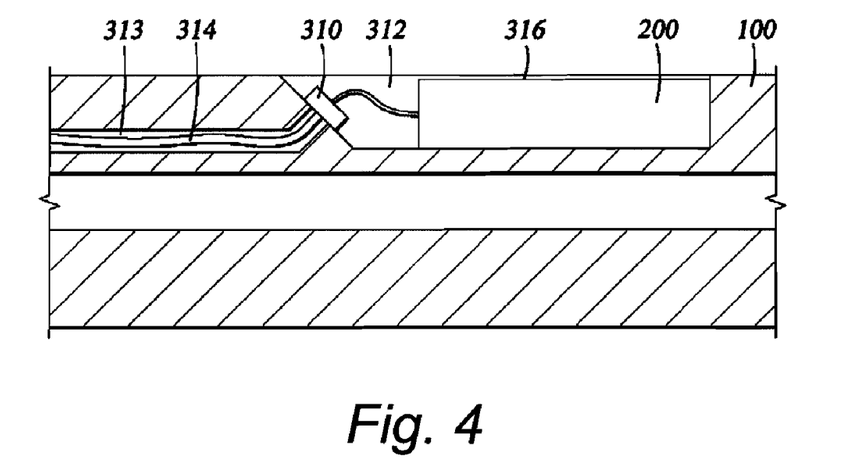
FIG. 4 is a cross-section side view of an enclosure disposed in a downhole tubular in accord with the invention.

The compact design and small component dimensions of the enclosures 200 of the invention allow one to construct a transducer unit that is smaller compared to conventional transducer packages. As such, the enclosures of the invention can be disposed on downhole tools in various ways. FIG. 4 shows a side view of an enclosure 200 of the invention disposed in a downhole tool 100. The enclosure 200 is in a recess 312 formed in the tool 100 wall. The enclosure 200 is coupled to a bulkhead 310 that ties into a passage 313, also referred to as a feedthrough, for signal/power transmission between the transducers 210 and external components (e.g., electronics, telemetry, memory, etc.) via one or more leads 314 as known in the art. A shield 316 may be used to cover the enclosure as described below.

Figure 5:
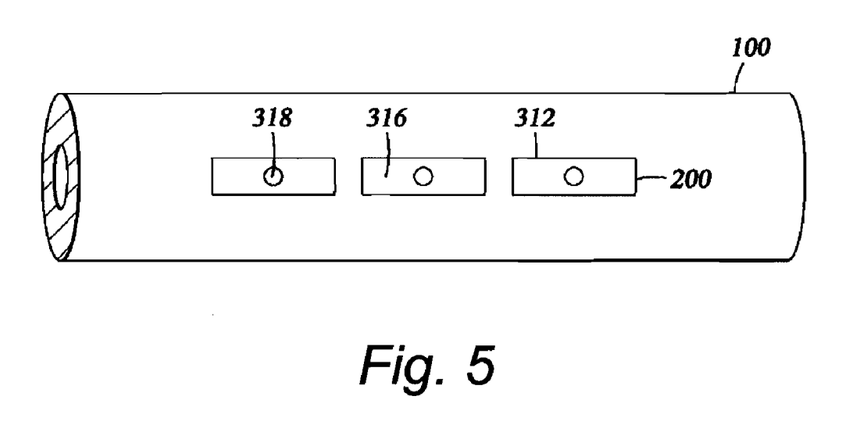
FIG. 5 shows a perspective view of a downhole tubular configured with enclosures and shields in accord the invention.

FIG. 5 shows a series of enclosures 200 disposed in a downhole tool 100. Each enclosure 200 is disposed in a separate recess 312 formed substantially parallel to the longitudinal axis of the tool 100. As mentioned above, shields 316 can be placed over the enclosures 200 for protection against abrasion and collision. The shields 316 may be formed of any suitable material and are preferably configured with one or more apertures 318. The shields 316 can be affixed to the downhole tool 100 using any suitable means as known in the art. Another implementation can be configured with a plurality of enclosures 200 disposed in one elongated recess or void formed in the tool 100 wall (not shown).

Figure 6:
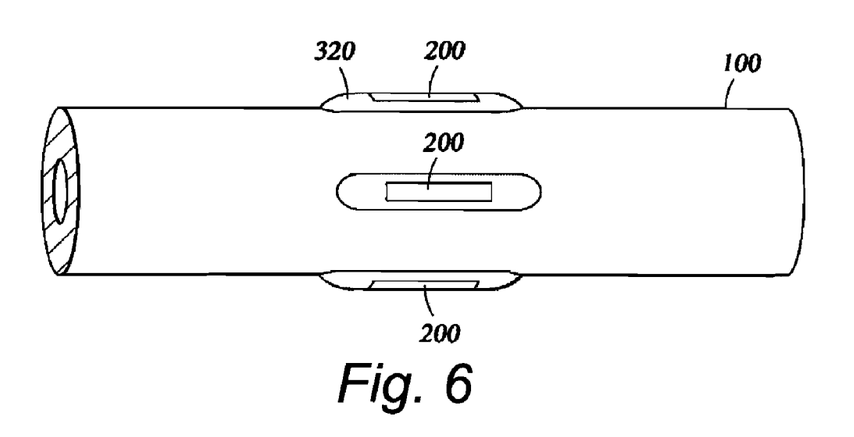
FIG. 6 shows a perspective view of another downhole tubular configured with enclosures in accord with the invention.

FIG. 6 shows another implementation of the invention. The enclosures 200 are shown disposed in a downhole tool 100 equipped with stabilizer blades 320. With this embodiment, the transducers 210 within the enclosures 200 can be maintained in direct contact with the borehole wall for more accurate measurements. Those skilled in the art will appreciate that the enclosures 200 of the invention can be disposed on downhole tools in many ways depending on the desired measurements and mode of tool conveyance within a borehole. For example, an enclosure 200 can be affixed to casing tubulars (inside or outside) using conventional fasteners or clamping means and linked by cable(s) for power/communication for long-term monitoring applications.

Figure 7:
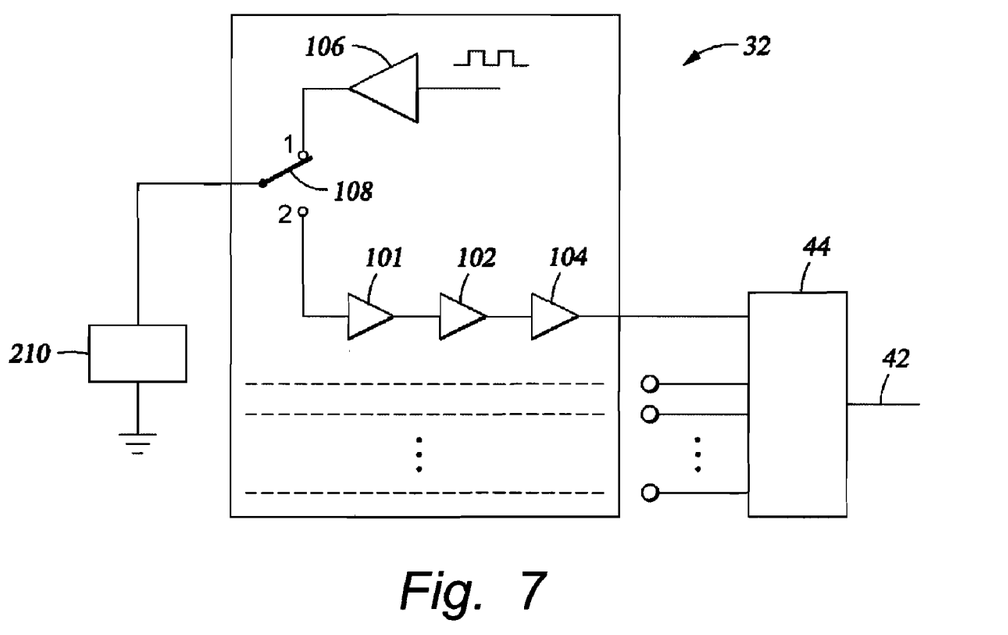
FIG. 7 is a schematic of a transducer electronics module and multiplexer module in accord with the invention.

FIG. 7 shows a general schematic layout of an electronics module 32 that can be implemented in an electronic board 230 of the enclosures of the invention. The module 32 includes a preamplifier stage 101, a filter stage 102, an analog-digital converter (ADC) stage 104, and a power amplifier stage 106. The module 32 is shown linked to an n-to-1 multiplexer (MUX) unit 44 adapted to funnel "n" signals to one channel for output through lead 42. A switch 108 linked to the transducer element 210 toggles between position 1 and position 2. In position 1, the transducer 210 is activated by the power amplifier stage 106 and the transducer is implemented as a transmitter. With the switch 108 in position 2, the preamplifier stage 101 receives the analog acoustic energy signal detected by the element 210 and it is processed through the module 32 to implement a receiver. The small package and low power electronics module 32 integrated with the transducer 210 minimizes power consumption and improves noise reduction since digital signals are cleaner compared to analog signals. The digitized signal data can also be routed far distances for additional processing free of unwanted noise if desired.

Figure 8:
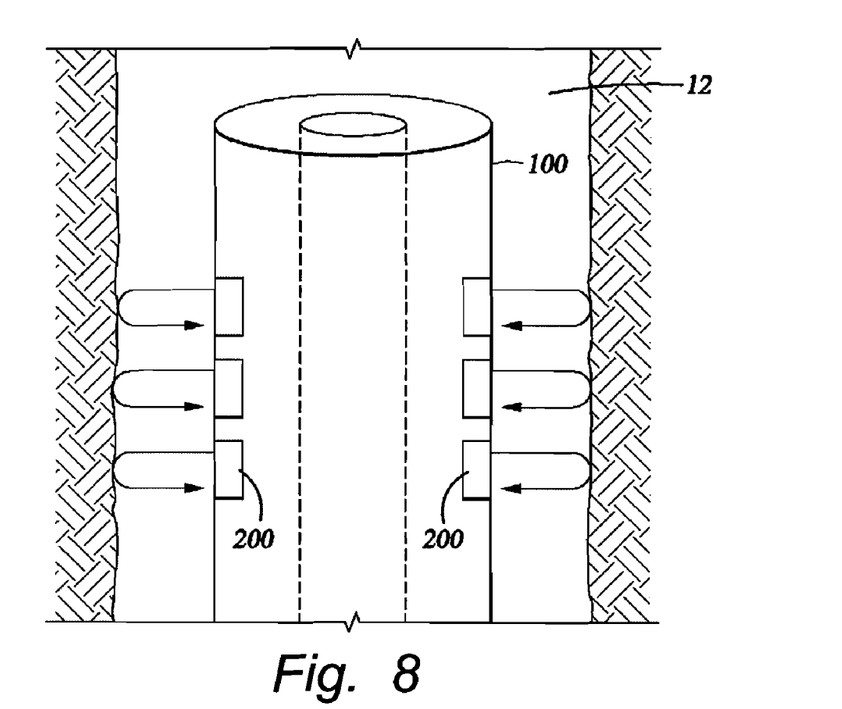
FIG. 8 shows a downhole tubular equipped with acoustic transducers of the invention.

The dual-purpose transducers (i.e., source-sensor) 210 of the invention allow for pulse echo measurements. As known in the art, the measurement of two-way travel time of a pulse echo signal reflected from the borehole 12 wall can be used to determine the borehole geometry, such as its radius or standoff. FIG. 8 shows an implementation of the invention operating in a pulse echo mode. A downhole tool 100 is equipped with several axially and azimuthally distributed enclosures 200 of the invention. Using an electronic module 32, the transducer(s) 210 within the enclosures 200 can be switched between modes to obtain the pulse echo measurements in the borehole 12. The measured acoustic signal data can be processed using conventional techniques known in the art.

Figure 9:
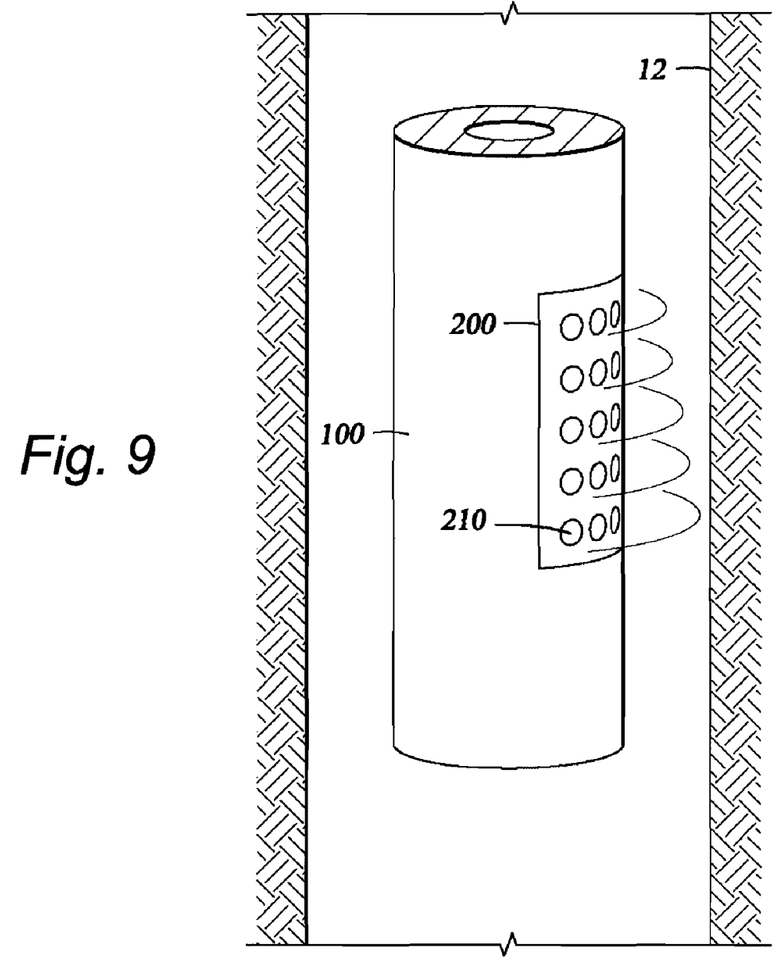
FIG. 9 illustrates a downhole tool equipped with enclosures containing an array of transducers in accord with the invention.

FIG. 9 shows another implementation of the invention. A downhole tool 100 is equipped with an enclosure 200 of the invention housing a series or bank of aligned transducers 210. With this configuration, the transducers 210 can be activated in a timed or phased sequence for targeted and controlled measurements. For example, by timing their activation, the 'angle' of the transducers 210 can be varied electrically in such a way that signal beam/energy can be transmitted/received at the normal or at oblique incidence with reference to the borehole wall. Other implementations can be configured with a bank of individual enclosures 200 located adjacent or near one another to achieve such phased array measurements (not shown). The timing and activation of the transducers 210 can be controlled by conventional software means and electronics on the electronic board 230.

Figure 10:
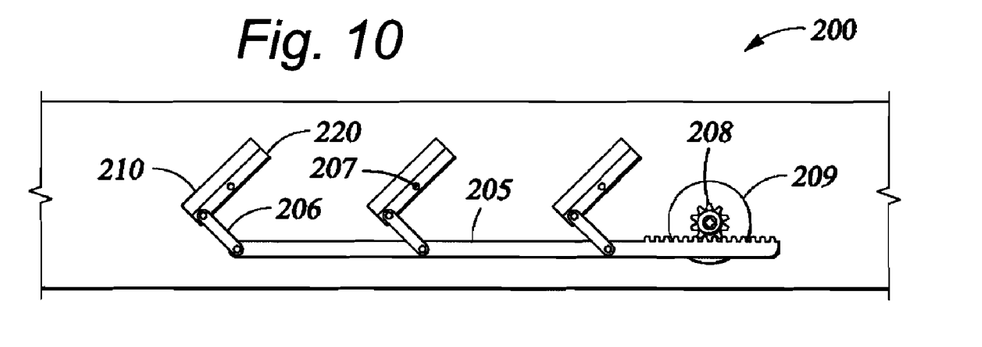
FIG. 10 is a side view of an enclosure equipped with mechanically rotatable transducers in accord with the invention.

FIG. 10 shows a side view of another enclosure 200 implementation of the invention. In this configuration, the backing elements 210 are linked to an actuator rod 205 via individual hinged connecting rods 206. The backing elements 210 are each mounted on individual axles 207 that allow the backing elements to pivot and rotate about a fixed axis such that the affixed transducer elements 210 can rotate in either direction. The actuator rod 205 includes a gear rack at one end to engage with a pinion gear 208 on a motor 209 mounted within the enclosure 200, forming a rack-and-pinion gear system. The motor 209 can be activated to rotate in either direction to move the actuator rod 205, which in turn pulls or pushes the connecting rods 206 to rotate the transducer elements 210 such that the element faces are positioned at a desired angle for targeted measurements. The motor 209 can be linked through the electronic board 230 for activation and control. It will be appreciated by those skilled in the art that various mechanical configurations as known in the art can be used to alter the position or angles of the transducers as desired in other enclosure implementations of the invention.

Figure 11:
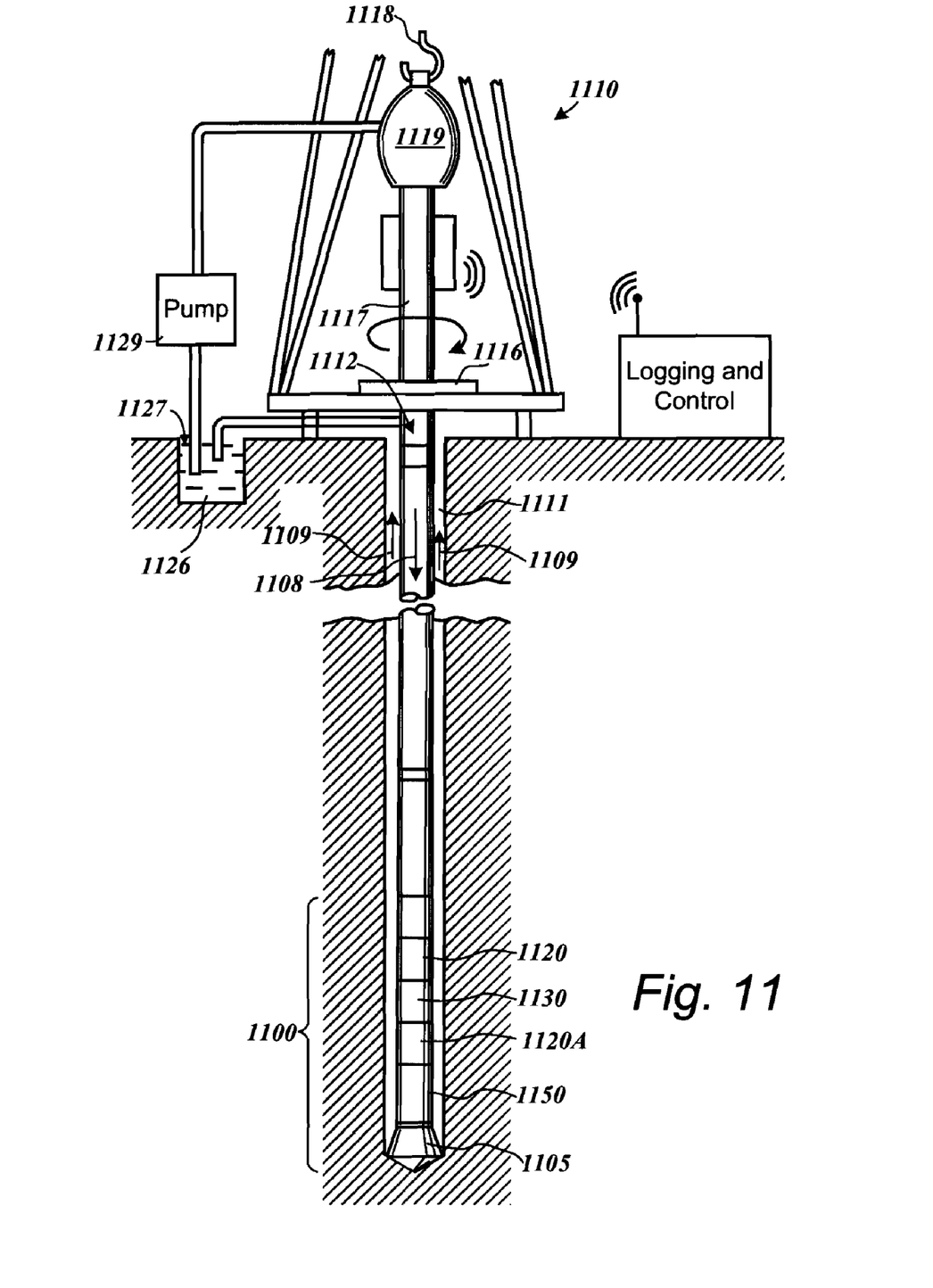
FIG. 11 illustrates a wellsite system in which the present invention can be employed.

FIG. 11 illustrates a wellsite system in which the present invention can be employed. The wellsite can be onshore or offshore. In this exemplary system, a borehole 1111 is formed in subsurface formations by rotary drilling in a manner that is well known. Embodiments of the invention can also use directional drilling, as will be described hereinafter.

A drill string 1112 is suspended within the borehole 1111 and has a bottom hole assembly 1100 which includes a drill bit 1105 at its lower end. Note that according to some embodiments, bottom hole assembly 1100 corresponds to the downhole tool 100 that is shown and described in other figures and descriptions herein. The surface system includes platform and derrick assembly 1110 positioned over the borehole 1111, the assembly 1110 including a rotary table 1116, kelly 1117, hook 1118 and rotary swivel 1119. The drill string 1112 is rotated by the rotary table 1116, energized by means not shown, which engages the kelly 1117 at the upper end of the drill string. The drill string 1112 is suspended from a hook 1118, attached to a traveling block (also not shown), through the kelly 1117 and a rotary swivel 1119 which permits rotation of the drill string relative to the hook. As is well known, a top drive system could alternatively be used.

In the example of this embodiment, the surface system further includes drilling fluid or mud 1126 stored in a pit 1127 formed at the well site. A pump 1129 delivers the drilling fluid 1126 to the interior of the drill string 1112 via a port in the swivel 1119, causing the drilling fluid to flow downwardly through the drill string 1112 as indicated by the directional arrow 1108. The drilling fluid exits the drill string 1112 via ports in the drill bit 1105, and then circulates upwardly through the annulus region between the outside of the drill string and the wall of the borehole, as indicated by the directional arrows 1109. In this well known manner, the drilling fluid lubricates the drill bit 1105 and carries formation cuttings up to the surface as it is returned to the pit 1127 for recirculation.

The bottom hole assembly 1100 of the illustrated embodiment a logging-while-drilling (LWD) module 1120, a measuring-while-drilling (MWD) module 1130, a roto-steerable system and motor, and drill bit 1105.

The LWD module 1120 is housed in a special type of drill collar, as is known in the art, and can contain one or a plurality of known types of logging tools. It will also be understood that more than one LWD and/or MWD module can be employed, e.g. as represented at 1120A. (References, throughout, to a module at the position of 1120 can alternatively mean a module at the position of 1120A as well.) The LWD module includes capabilities for measuring, processing, and storing information, as well as for communicating with the surface equipment. In the present embodiment, the LWD module includes a sonic measuring device. According to some embodiments, LWD module 1120 includes downhole tool 100 shown and described in figures and description elsewhere herein.

The MWD module 1130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

Figure 12:
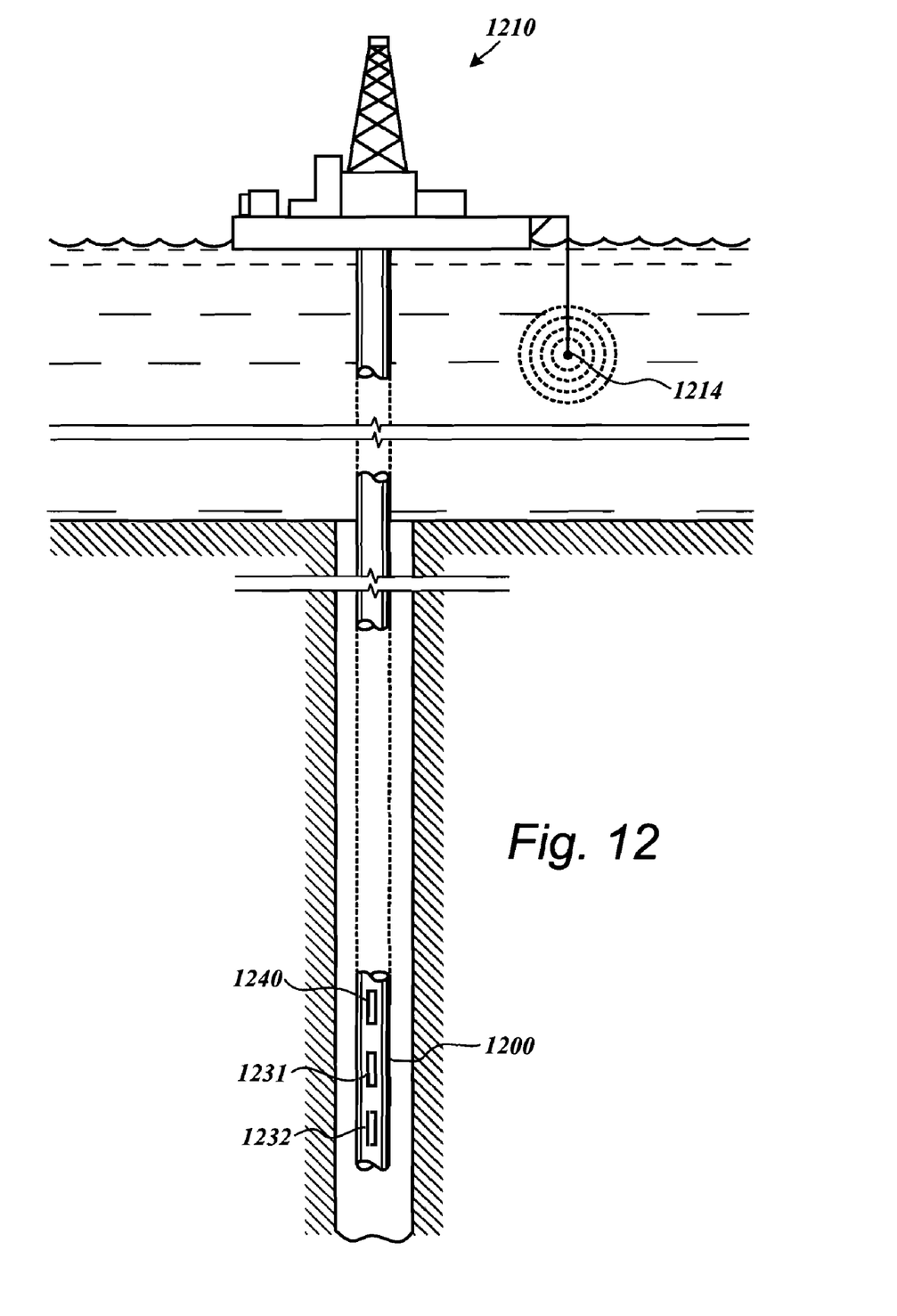
FIG. 12 illustrates a sonic logging-while-drilling tool on which the present invention can be employed.

FIG. 12 illustrates a sonic logging-while-drilling tool which can be the LWD tool 1120, or can be a part of an LWD tool suite 1120A of the type described in U.S. Pat. No. 6,308,137, incorporated herein by reference. In a disclosed embodiment, as shown in FIG. 12, an offshore rig 1210 is employed, and a sonic transmitting source or array 1214 is deployed near the surface of the water. Alternatively, any other suitable type of uphole or downhole source or transmitter can be provided. An uphole processor controls the firing of the transmitter 1214. The uphole equipment can also include acoustic receivers and a recorder for capturing reference signals near the source. The uphole equipment further includes telemetry equipment for receiving MWD signals from the downhole equipment. The telemetry equipment and the recorder are typically coupled to a processor so that recordings may be synchronized using uphole and downhole clocks. The downhole LWD module 1200 includes at least acoustic receivers 1231 and 1232, which are coupled to a signal processor so that recordings may be made of signals detected by the receivers in synchronization with the firing of the signal source. A separate acoustic transmitter 1240 can be provided. According to some embodiments the acoustic transmitter 1240, and acoustic receivers 1231 and 1232 can each be implemented using one or more transducers 210 mounted in an enclosure 200, and or transmitter 1320 and receivers 1312, 1314 and 1316 in package 1300 as shown and described in other figures and descriptions herein.

According to various embodiments described herein, transmitters and receiver arrays can be mounted in an LWD setting while having very small inter-sensor spacings and steep mounting angles, in a single package, using a single hole through the tool collar for electrical connection.

Figure 13:
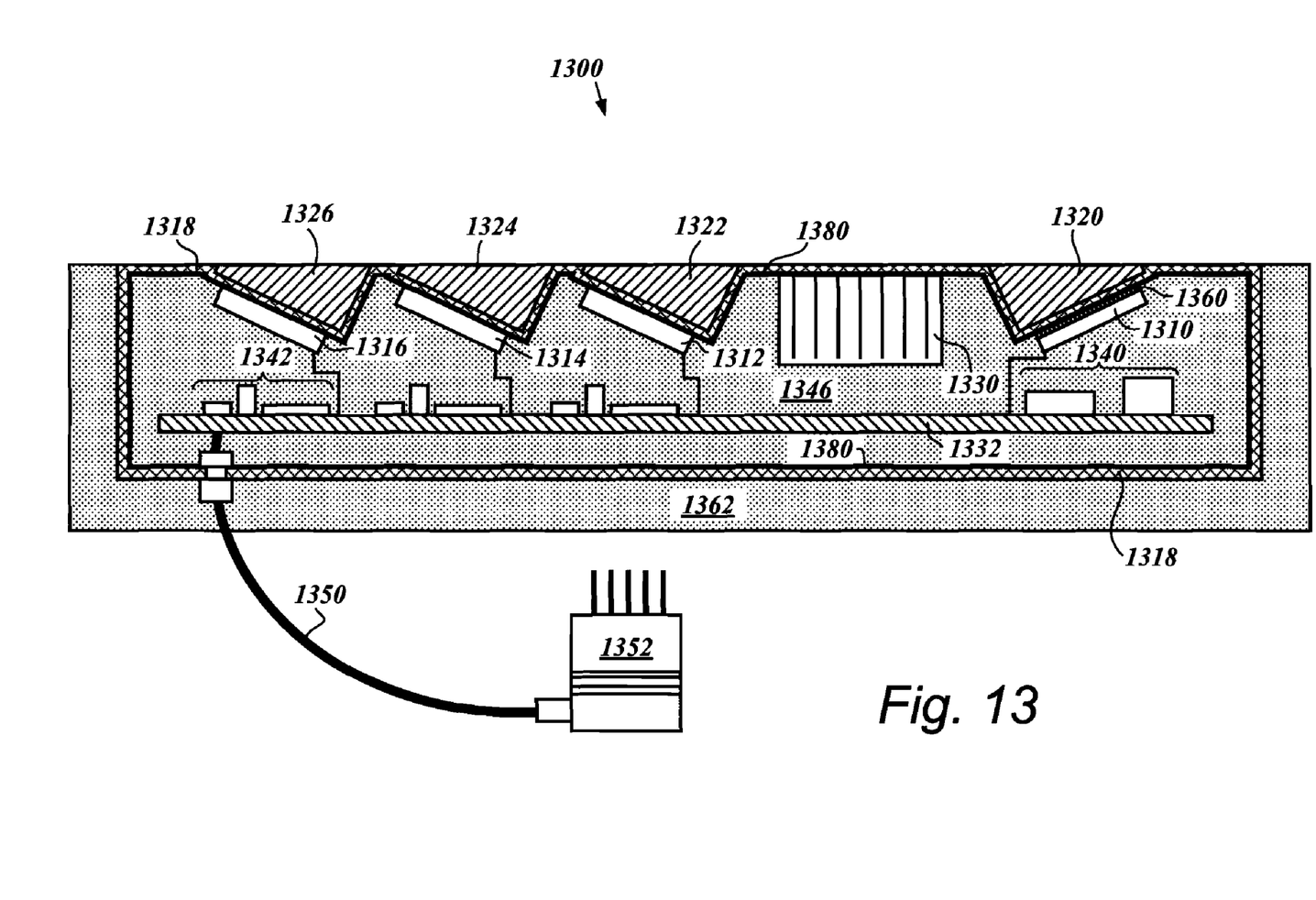
FIG. 13 shows an acoustic transmitter-receiver package for use in an LWD setting.

FIG. 13 shows an acoustic transmitter-receiver package for use in an LWD setting. Transmitter-receiver package 1300 is mounted off-axis along the outer surface of an LWD tool in various arrangements such as shown with respect to enclosures 200 being mounted on downhole tool 100 as shown in figures and described elsewhere herein. Housed within package 1300 are transmitter 1310 and a receiver array including receivers 1312, 1314 and 1316 housed within packaging wall 1318. According to some embodiments, wall 1318 is fabricated from polyetheretherketone PEEK®. By deploying all of the main elements of an acoustic measurement within a single block, much control over the final acoustic signal-quality is maintained.

Transmitter firings can be isolated from the tool collar by the use of dampening, filler-material 1346 such as tungsten-loaded-rubber within the enclosed by wall 1318. The use of such filler material helps to reduce any "tool-arrival" signals at the receivers. Similarly, the receivers are acoustically isolated from the collar with the same material 1346. The filler-material 1346 thus also helps to reduce "noise" on the measurement due to drilling induced collar vibrations. A pressure compensating fluid, such as Sylgard® 182 or other polymerized gel or silicone oil is also enclosed within the cavity formed by wall 1318. The filler-material 1346 can be molded in place within the cavity, or it can be inserted as a solid piece and backfilled with the pressure compensating fluid. According to some embodiments, a deformable membrane 1380 is provided along the inner surface of wall 1318 so as to allow for volume changes of the material 1346 and/or pressure compensating fluid inside of the enclosure.

According to some embodiments, an acoustic dampening material 1362 may also surround the exterior of package wall 1318 further reducing vibrational noise from the collar. The material used for dampening material 1362 can be the same as used in material 1346, namely, tungsten-loaded rubber.

Direct sensor signals, such as transmitter to receiver signals that travel directly through the device body, can be controlled either by special attenuators between transmitter and receivers, such as attenuator block 1330, or simply by the use of the attenuating filler-material 1346. Attenuator block 1330 is a network of acoustic scatterers, whose material, size, and configurations are chosen based on the transmitting frequencies. According to some embodiments, attenuator block 1330 utilizes scattering means, absorptive means, or both. According to one embodiment, block 1330 includes series of steel plates for scattering, separated by tungsten rubber for absorption. For frequencies of about 150KHz, a steel thickness of about 0.1 inches separated by about 0.125 inches was found to be suitable. Likewise, inter-receiver acoustic coupling is greatly reduced versus what could be achieved by simply inserting individual transducers into individual holes in a thick steel collar, particularly since steel is an excellent acoustic conduit. Thus, according to some embodiments, the attenuating and/or scattering isolative material is provided between the transmitter and receivers, between the receivers themselves, the receivers and the main tool body, and/or transmitters and the main tool body.

Each transmitter and receiver includes a window, namely window 1320 for transmitter 1310, and windows 1322, 1324 and 1326 for receivers 1312, 1314 and 1316, respectively. Note that the windows correspond to the wedges 250 described above and shown in other figures herein. The windows can be placed over the sensors and preferably outside the wall 1318 as shown, and thus serve multiple functions. According to some embodiments, the windows are simply replaceable "wear-plates", taking the abuse of the drilling environment in order to protect the sensor ceramics. Since the windows are located outside the wall 1318, they are easily replaced. According to other embodiments, the windows are also used as refractive beam steering, or beam shaping, lenses. That is, the windows are designed bend the beam to specific angles, determined by the relationship of the window material and drilling-mud acoustic properties (Snell's Law). Likewise, the windows can be used for focusing or defocusing of the beam. As described above with respect to wedges 250, the material used for the windows may be made from polytetrafluoroethylene (PTFE) Teflon®. In general the material should be selected to provide adequate abrasion resistance for the harsh drilling environment and an optimal acoustic interface between the transducer and the formation fluid and/or formation wall, given the material's sound velocity, attenuation, and impedance characteristics.

Printed circuit board 1332 is located within the device package as shown and provides a variety of signal conditioning or processing functions of the received or transmitted signals. Board 1332 includes electrical circuits and components such as components 1340 for transmitter 1310 and components 1342 for receiver 1316 to facilitate these functions. Simple functions include passive filtering of the received signals. According to some embodiments, Board 1332 includes circuitry and components for active filters having finite, controllable gain stages. Additionally, board 1332 can include receiver multiplexer circuits. At the transmitter side, components 1340 can include pulser electronics for pulse control and/or pulse shaping. According to some embodiments, processing means are also included on board 1332, to produce final measured results, such as the peak amplitude of a reflected pulse or the transit time of a caliper measurement. Package housing wall 1318 substantially surrounds the transmitter, receiver array, circuit board, and attenuative material 1346 as shown. Circuit board 1332 communicates with the tool body via a single cable 1350, which passes through the package housing wall 1318, and through a single through-hole in the LWD tool body (not shown). Connection is made to the LWD tool via connection plug 1352.

According to some embodiments, the transmitters and receivers are designed to operate in an ultrasonic range. For example, it has been found that the described components can be useful for measurement centered at around 150KHz. Each of the receivers in the receiver array are angled at about 35 degrees from perpendicular (i.e. 35 degrees from a direction orthogonal to the main axis of the enclosure and the drill collar) and contained in a fabricated polyetheretherketone PEEK® enclosure. The transmitter is similarly angled at about 35 degrees, such that it angles towards the receivers. Material 1346 is tungsten-rubber attenuating material.

According to other embodiments, the transmitter 1310 includes a large number, for example 16, 64 or 100, of transducer elements 1360 and can be activated in a timed or phased sequence to more precisely direct the acoustic energy from transmitter 1310. For example, by timing their activation, the effective 'angle' of the transmitter 1310 can be varied electrically in such a way that signal beam/energy can be transmitted at the normal or at oblique incidence with reference to the borehole wall. The timing and activation of the transducer elements 1360 of transmitter 1310 can be controlled by conventional software means and electronics on the electronic board 1332.

According to some embodiments, electronics board 1332 includes electronics that are capable of digitizing, processing and recording waveforms and processed acoustic properties from the acoustic measurements detected by the receivers 1312, 1314 and 1316. According to some embodiments, electronics board 1332 also includes electronics for synchronizing the acoustic measurements from the transmitter 1310 and receivers 1312, 1314 and 1316 with direction and/or inclination measurements made by a direction measuring device and/or an inclination measuring device which are included in the LWD and/or MWD modules as described herein with respect to FIG. 11.

Thus, according to some embodiments, a complete acoustic sensor system is mounted in a single package located on the outside of a LWD tool, using only a single through-hole for electrical connection. According to other embodiments, the device can also be deployed as a complete measurement system, supplying a final derived measurement.

The technologies described herein may be implemented in various fields of use. They are not limited to subsurface applications. The application for acoustic transducers is just an example of the potential uses for this invention. The technologies described herein may be used to package all types of transducer devices, which can then be interfaced with power, control, or recording systems external to the enclosure 200. It will also be appreciated that the transducers are not limited to operation within any specific frequency or frequency range. Various geometries described herein merely represent a small sample of the many potential applications and designs that are covered by implementations of various technologies described herein. For example, enclosures of the invention may be configured in various shapes other than a rectangular unit (not shown). It will also be appreciated that the various technologies described herein may be implemented in any type of downhole tool or application, such as wireline, LWD/MWD, coiled tubing, casing tubulars, logging-while-tripping, logging-while-casing, reservoir monitoring, etc.

What is claimed is:

1. A measurement package for disposal on a downhole tool, the measurement package comprising:
    an enclosure;
    a first acoustic transducer housed within the enclosure;
    a second acoustic transducer housed within the enclosure;
    an acoustic attenuative material positioned within the enclosure so as to substantially attenuate acoustic energy travelling from the first acoustic transducer to the second acoustic transducer, wherein the attenuative material includes an attenuative block positioned between the first and second acoustic transducers; and
    electronics housed within the enclosure and in communication with the first and second acoustic transducers.

2. The measurement package according to claim 1, wherein the enclosure is designed for mounting on a portion of a drill collar such that the enclosure is located substantially away from the central axis of the drill collar.

3. The measurement package according to claim 1, wherein the attenuative block includes alternating acoustic energy scattering members and acoustic energy absorption members.

4. The measurement package according to claim 3, wherein scattering members are steel and the absorption members are rubber.

5. The measurement package according to claim 1, wherein the acoustic attenuative material is housed within the enclosure and substantially surrounding at least the first and second acoustic transducers.

6. The measurement package according to claim 5, wherein the attenuative material substantially attenuates acoustic energy between the first acoustic transducer and the downhole tool.

7. The measurement package according to claim 5, wherein the attenuative material is primarily solid.

8. The measurement package according to claim 7, wherein the material includes a tungsten-rubber attenuating material.

9. The measurement package according to claim 1, wherein the attenuative material is outside the enclosure.

10. A The measurement package according to claim 9, wherein the attenuative material is absorbs substantial amounts of acoustic energy and surrounds the enclosure so as to substantially attenuate acoustic energy travelling between the downhole tool and the enclosure.

11. The measurement package according to claim 1, wherein the first and second acoustic transducers are disposed at one or more non-perpendicular angles with respect to the longitudinal axis of the enclosure.

12. The measurement package according to claim 11, wherein the first acoustic transducer is an acoustic transmitter and disposed at a first angle with respect to the longitudinal axis of the enclosure, and the second acoustic transducer is an acoustic receiver and disposed at a second angle with respect to the longitudinal axis of the enclosure.

13. The measurement package according to claim 1, wherein the first acoustic transducer is a transmitter and the second acoustic transducer is a first acoustic receiver, the enclosure further comprising a second acoustic receiver and a third acoustic receiver, the second and third receivers being housed within the enclosure.

14. The measurement package according to claim 1, further comprising a first window member positioned in front of the first acoustic transducer and outside the enclosure, and a second window member positioned in front of the second acoustic transducer and outside the enclosure.

15. The measurement package according to claim 14, wherein the first and second window members are replaceable and protect the first and second acoustic transducers from the borehole environment while transmitting acoustic energy between the borehole environment and the first and second acoustic transducers.

16. The measurement package according to claim 14, wherein the first and/or second windows members are dimensioned and constructed of materials which have acoustic refractive properties that allow for beam steering and/or beam shaping of acoustic energy transmitted or received by one of the first acoustic transducer, the second acoustic transducer or both.

17. The measurement package according to claim 1, wherein the first acoustic transducer is a transducer array including a plurality of individually activatable acoustic transmitter elements which can be controlled by the electronics such that a beam of acoustic energy can be directed in controlled directions.

18. The measurement package according to claim 1, wherein the first and second acoustic transducers are designed to operate primarily in the ultrasonic acoustic range.

19. A downhole tool for subsurface disposal, the downhole tool comprising:
an elongated support;
an enclosure disposed on the elongated support, the enclosure comprising:
a first acoustic transducer housed within the enclosure;
a second acoustic transducer housed within the enclosure;
an acoustic attenuative material positioned within the enclosure so as to substantially attenuate acoustic energy travelling from the first transducer to the second transducer,
wherein the acoustic attenuative material includes a attenuative block having alternating acoustic scattering members and acoustic absorbing members; and
electronics coupled to the first acoustic transducer and the second acoustic transducer, wherein the electronics are housed within the enclosure.

20. The downhole tool according to claim 19, wherein the elongated support is a drill collar.

21. The downhole tool according to claim 19, wherein the acoustic attenuative material is substantially surrounding at least the first and second acoustic transducers, the attenuative material substantially absorbing acoustic energy between the first acoustic transducer and the elongated support.

22. The downhole tool according to claim 19, wherein the attenuative material is outside the enclosure, that absorbs substantial amounts of acoustic energy and surrounds the enclosure so as to substantially attenuate acoustic energy travelling between the elongated support and the enclosure.

23. The downhole tool according to claim 19, wherein the first and second acoustic transducers are disposed at one or more non-perpendicular angles with respect to the longitudinal axis of the elongated support.

24. The downhole tool according to claim 19, further comprising a first window member positioned in front of the first acoustic transducer and outside the enclosure, and a second window member positioned in front of the second acoustic transducer and outside the enclosure.

25. The downhole tool according to claim 24, wherein the first and second window members are replaceable and protect the first and second acoustic transducers from the borehole environment while transmitting acoustic energy between the borehole environment and the first and second acoustic transducers.

26. The downhole tool according to claim 19, wherein the first acoustic transducer is a transducer array including a plurality of individually activatable acoustic transmitter elements which can be controlled by the electronics such that a beam of acoustic energy can be directed in controlled directions.

27. The downhole tool according to claim 19, wherein the first and second acoustic transducers are designed to operate primarily in the ultrasonic acoustic range.

28. A method for making acoustic measurements in a borehole with a downhole tool, the method comprising:
positioning the downhole tool in the borehole, the downhole tool having an enclosure disposed thereon
disposing within the enclosure is a first transducer and a second transducer;
disposing an acoustic attenuative material within the enclosure so as to substantially surround at least the first and second transducers and to substantially attenuate acoustic energy travelling from the first transducer to the second transducer along with the attenuative material substantially attenuating acoustic energy, wherein the acoustic attenuative material includes a attenuative block having alternating acoustic scattering members and acoustic absorbing members; activating a first transducer so as to transmit acoustic energy into the downhole environment; and
detecting a response to the transmitted acoustic energy with a second transducer, wherein the enclosure houses the first and second transducers and electronics coupled to the first and second transducers.

29. The method according to claim 28, wherein the method is carried out during the construction process of the borehole.

30. The method according to claim 28, wherein the acoustic energy travelling between the downhole tool and the enclosure is substantially attenuated with attenuative material outside and surrounding at least portions of the enclosure.

31. The method according to claim 28, wherein the first transducer is a transducer array including a plurality of individually activatable acoustic transmitter elements which can be controlled by the electronics such that a beam of acoustic energy can be directed in controlled directions.

32. The method according to claim 28, wherein the first and second transducers are designed to operate primarily in the ultrasonic acoustic range.

33. The method according to claim 28, further comprising using the electronics to synchronize the activating of the first transducer and the detecting with the second transducer.

34. The method according to claim 28, further comprising using the electronics to digitize, process and record waveforms and processed acoustic properties relating to responses detected by the second transducer.

35. The method according to claim 28, further comprising using the electronics to synchronize acoustic measurements made with the first and second transducers with directional and/or inclination measurements made using the downhole tool.

36. A measurement package for disposal on a downhole tool, the measurement package comprising:

an enclosure;

a pressure compensating fluid housed within the enclosure;

a deformable membrane housed within the enclosure so as to allow for volume changes of the pressure compensating fluid due to changes in pressure;

a first acoustic transducer housed within the enclosure;

a second acoustic transducer housed within the enclosure; and electronics housed within the enclosure and in communication with the first acoustic transducer and the second acoustic transducer.

* * * * *